United States Patent [19]

Fleet et al.

[11] 4,108,755

[45] Aug. 22, 1978

[54] METALLIC FILAMENT ELECTRODE

[75] Inventors: Bernard Fleet, London; Sankar Das Gupta, New Malden, both of England

[73] Assignee: Ontario Limited, Toronto, Canada

[21] Appl. No.: 810,253

[22] Filed: Jun. 27, 1977

Related U.S. Application Data

[62] Division of Ser. No. 599,458, Jul. 28, 1975, Pat. No. 4,046,664.

[51] Int. Cl.² .................... C25B 9/00; C25B 11/02
[52] U.S. Cl. .................................... 204/263; 204/275; 204/289
[58] Field of Search ............... 204/275, 263, 294, 289

[56] References Cited

U.S. PATENT DOCUMENTS

| | | | |
|---|---|---|---|
| 2,563,903 | 8/1951 | Zadra | 204/275 X |
| 3,450,622 | 6/1969 | Cothran | 204/275 X |
| 3,953,313 | 4/1976 | Levenson | 204/294 |

Primary Examiner—John H. Mack
Assistant Examiner—D. R. Valentine
Attorney, Agent, or Firm—Rogers, Bereskin & Parr

[57] ABSTRACT

The invention provides an electrode for use in an electrochemical reactor. The electrode comprising a plurality of metallic filaments consisting of carbon fibers coated with a metal, each of the metallic filaments being in electrical contact with at least several of the other metallic filaments for transmitting an electrical potential substantially throughout the electrode when the electrode is in use in the reactor.

3 Claims, 6 Drawing Figures

U.S. Patent
Aug. 22, 1978
4,108,755
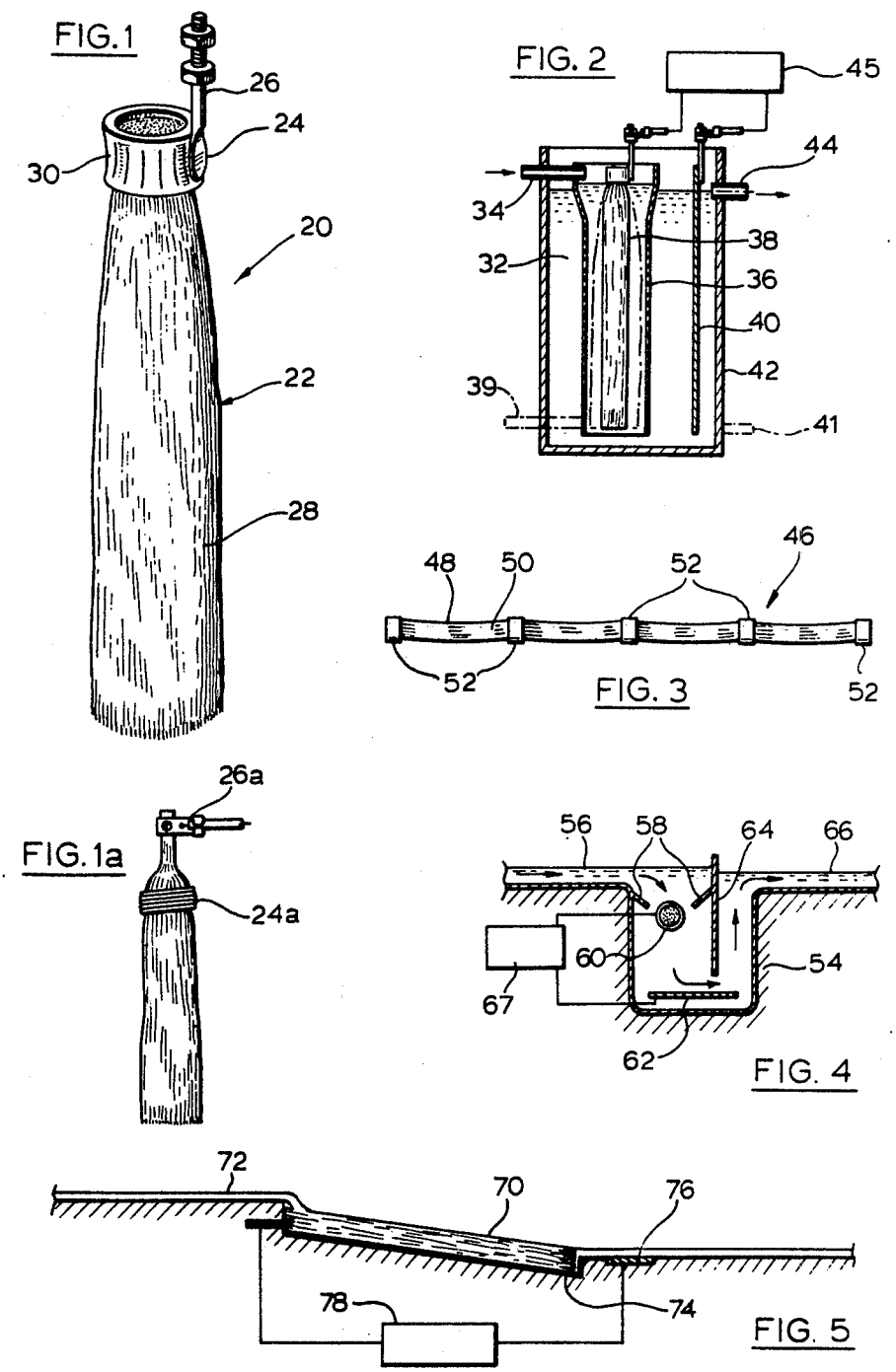

METALLIC FILAMENT ELECTRODE

This application is a divisional of Pat. U.S. patent application Ser. No. 599,458 filed on July 28, 1975, now U.S. No. 4,046,664.

This invention relates to improvements in electrochemical reactors, and more particularly to an improved electrode for use in such reactors.

Electrochemical reactors are used in many different processes and consequently there are a great number of different structures in use. Among these processes are electrochemical synthesis, electrolysis, electrorefining, electrowinning, electrometallurgy, electrogeneration of chemical species, and electrochemical treatment of waste.

The efficiency of any electrochemical reactor is related closely to the characteristics of the working electrode and more particularly to the surface area of this electrode and to the distribution of electrical potential on the surface of the electrode. If the surface area is maximized the electrode will be capable of creating a large mass transfer flux, and if the potential is constant across the surface area, the electrode will be controllable to be highly selective and thereby ensure that desired results can be achieved. It is also important however that the surface area be fully exposed to the electrolyte. This is particularly the case in continuous processes where the electrolyte flows over the electrode. In such processes the advantages of large surface area will be offset to some extent if that surface area is not continuously exposed to flowing electrolyte.

Because the economic and commercial viability of any electrochemical process depends to a large extent on the efficiency of the reactor, any improvement in the performance of a reactor would significantly influence the cost of operating the process.

Different electrode designs have been attempted to optimize reactor efficiency. One design provides an electrode consisting of a particulate bed and although this structure provides a significant increase in surface area, the potential distribution is somewhat unpredictable due to potential drop caused by poor contact between the particles. Further, the requirements of proper electrolyte flow in a continuous process tend to be somewhat contrary to providing close mechanical contact between the particles because such contact would tend to restrict flow. In general, the improved surface area in a particulate bed electrode provides advantages which are somewhat offset or cancelled by the poor potential distribution in the electrode. An example of such a structure is found in U.S. Pat. No. 3,827,964 to Katsuhiro Okubo et al.

Another design provides a fluidized bed electrode. The movement of the particles in the bed results in poor potential distribution so that this electrode does not permit accurate control. Consequently, the advantages of improved surface area are again offset by poor potential distribution.

Apart from attempts to use granular or particulate beds, the approach to optimizing electrode efficiency has been to devise various arrangements of sheets and the like to create multi-plate electrodes separated by small spaces. The improved surface area is not comparable with that of granular beds but the structure does provide a better potential distribution. However, a further disadvantage in these structures is that the small spaces between the plates tend to become blocked and are difficult to arrange for adequate electrolyte flow. Most designs of this type which offer reasonable efficiency include devices for stirring the electrolyte or otherwise forcing the electrolyte through the electrode.

For the purposes of the present description and claims, the term "metallic filament" is used to describe all filaments made from one metal, fibers which are coated with a metal; and all metal filaments which are coated with another metal. The term includes carbon fibers which are coated with a metal, as well as alloys which are coated with a metal.

It is an object of the present invention to provide an electrochemical reactor and more particularly a metallic electrode for such a reactor, in which the electrode exhibits a combination of improved distribution of electrical potential together with a high surface area to volume ratio, and in which the electrode exhibits good surface contact with moving electrolyte when the electrode is used in a continuous process.

Accordingly in one of its aspects the invention provides an electrode for use in an electrochemical reactor, the electrode comprising a plurality of metallic filaments consisting of carbon fibers coated with a metal, each of the metallic filaments being in electrical contact with at least several of the other metallic filaments for transmiting an electrical potential substantially throughout the electrode when the electrode is in use in the reactor.

In another of its aspects, the invention provides an electrode for use in an electrochemical reactor, the electrode comprising: a tow having a plurality of metallic and electrically conductive filaments, each of the filaments having a very small maximum thickness compared with the length of the filament, and the filaments being generally in side-by-side arrangement; and means retaining the filaments in their relative positions at a discrete portion of the tow.

The invention will be better understood with reference to the drawings, in which:

FIG. 1 is a perspective view of an electrode according to the invention;

FIG. 1a is a side view of another electrode according to the invention;

FIG. 2 is a somewhat diagrammatic section view of a reactor incorporating the electrode shown in FIG. 1;

FIG. 3 is an elevation of another embodiment of electrode;

FIG. 4 is a sectional view of a reactor using the electrode shown in FIG. 3; and FIG. 5 is a sectional view of another reactor using an electrode according to the invention.

Reference is first made to FIG. 1 which illustrates an electrode 20 consisting of a tow 22 engaged in a coupling 24 at an upper end portion of the tow 22. This coupling also includes an upstanding electrical terminal 26 for connecting the electrode to an electrical power supply.

The tow 22 consists of numerous filaments 28 all of which are substantially the same length and which lie generally in side-by-side arrangement. Respective corresponding ends of the filaments 28 are co-terminus at the upper extremity of a ring 30 forming part of the coupling 24. This ring 30 has been deformed inwardly into firm engagement with the tow so that individual filaments within the ring are in electrical contact with one another. Consequently, because the ring is conductive, a potential applied at the terminal 26 will be transmitted by way of the ring 30 to the individual filaments 28. Filaments are of similar lengths, similar cross-sections, and of the same material. Consequently, the potential at any point in the length of a filament will correspond to the potential at the same point on all of the other filaments. If two filaments touch one another they will touch at corresponding points along the length of the filaments where the potential is the same and consequently this will not effect the potential distribution. Further, it is desirable that the filaments be metallic filaments which exhibit good electrical conductivity. Although many materials could be used, it is envisaged that copper filaments or carbon fibers coated with a metal will be most prevalent. In this context the term "carbon fiber" is used to describe all fibers which are prepared by various heat treatment methods from suitable organic precursors such as rayon or polyacrylonitrile fibers.

It will be appreciated that there are lower limits to the cross-sections of the filaments which are preferably as small in cross-section as possible. Some materials such as copper are particularly ductile and consequently copper filaments could be produced with very small cross-sections. In general, if a particular metal is to be used then the cross-section of individual filaments should be as small as possible in order to enhance the surface area in contact with electrolyte while at the same time enhancing electrolyte flow past the filaments due to the large number of filaments the electrolyte will meet.

The coupling 24 can take any suitable form consistent with maintaining the filaments in their relative positions over a discrete portion of the length of the tow while also permitting a potential to be applied to the filaments as consistently as possible. Consequently, it could be said that the coupling 24 performs two functions, firstly to locate the filaments relative to one another, and secondly to transmit a potential from a power source to the filaments.

As seen in FIG. 1a, the couple 24 (FIG. 1) could be replaced in a simple form by a binding 24a which may or may not be electrically conductive and by extending at least some of the filaments past the binding for use in making an electrical connection 26a.

A typical use of the electrode shown in FIG. 1 is illustrated in FIG. 2 in which the electrode is being used for electrowinning. Electrolyte 32 is being fed through an inlet 34 so that the electrolyte initially enters an electrolyte guide 36 positioned about an electrode 38 of similar form to that described with reference to FIG. 1. The guide 36 is open at its bottom so that the electrolyte is free to pass out of the bottom of the guide 36 and upwardly past a counter electrode 40 which is also positioned inside an electrolyte container 42. An electrolyte outlet 44 is provided adjacent the top of the container 42 and a power supply 45 is connected to the working electrode 38 and counter electrode 40.

In use, the individual filaments are free to move in the stream of an electrolyte as this electrolyte moves downwardly through the guide 36. Consequently, there is a tendency for the filaments to lie individually in the electrolyte due to flow effects around the filaments. The tow will then take up a position somewhat as that indicated in ghost outline in FIG. 2. Because of this movement in the tow, it is preferable that the guide 36 be non-conductive because it must be sufficiently close to the tow to ensure that flow effects through the tow are utilized. Further, as metal is deposited on the filaments due to the electrochemical process, the flow will tend to maintain this separation within limits of flow rate and weight of filaments.

Although the process shown in FIG. 2 demonstrates the use of the filaments in electrowinning, it will be evident that a reactor such as that shown in FIG. 2 can be used in effluent treatment and control, and electro-organic synthesis with or without conventional modifications to the reactor such as the use of electrochemical diaphragms and third or control electrodes. For instance the guide 36 could be an electrochemical diaphragm in which case the bottom of the guide would be closed and an outlet 39 used as indicated in ghost outline. Similarly an electrochemically compatible liquid would be fed into an inlet 41 (also shown in ghost outline) and this liquid would leave by way of outlet 44.

Reference is now made to FIG. 3 which shows an electrode 46 of an alternative form to that of electrode 20 (FIG. 1). Electrode 46 consists of a tow 48 made up of numerous metallic filaments 50 which are restrained at five discrete positions along the length of the filaments by couplings 52. Such an arrangement would be advantageous where the potential drop is large in a particular filament. By using a number of couplings the same potential can be provided at each of the couplings so that the lowest potential is found at the mid point between a pair of adjacent couplings. This optimizes the use of the filaments and reduces the potential variation in the electrode.

The electrode shown in FIG. 3 is conveniently used in a reactor 54 shown in FIG. 4. In this reactor, electrolyte 56 is flowing into the reactor and is guided by baffles 58 towards a working electrode 60 of the form shown in FIG. 3. This working electrode lies transversely of the direction of travel and the tow is slightly loose between the couplings 52 to provide minor transverse oscillation of the filaments as the electrolyte flows across the filaments. Subsequently, the electrolyte moves downwardly having left the electrode 60 and passes a counter electrode 62 under the major vertical baffle 64 which ensures that electrolyte first moves downwardly towards the counter electrode and then upwardly back into a stream 66. As illustrated, a suitable power supply 67 is provided.

The main uses of electrochemical reactors are in continuous processes where the electrolyte is changed continuously as was described with reference to FIGS. 2 and 4. However, in a reactor in which the electrolyte is not changed, there would be no need to use a guide such as the electrolyte guide 36 of FIG. 2. In such an embodiment, the electrode 38 would have to be spaced from the counter electrode 40 sufficiently to prevent a short circuit. Otherwise, the structure would be similar to that shown in FIG. 2 with the exclusion of the electrolyte guide 36. Similarly, in a process such as that shown in FIG. 4 it would be possible to use a bath in which the electrodes were contained, and after filling the bath, the flow would be curtailed and the electrochemical process allowed to take place. Subsequently, the electrolyte would then be removed from the bath and a further charge of electrolyte entered into the bath. In such a system the baffles 58 and the main baffle 64 could be eliminated, although of course the arrangement of electrodes can also be changed because the reason for their location in FIG. 4 is no longer pertinent.

The cross-sectional shape of the individual filament can be varied, although a circular cross-section has many advantages. Firstly, a circular cross-section is relatively simple to extrude, and secondly there is little possibility of circular filaments lying in contact with one another because there can be no surface-to-surface contact between such filaments. For this latter reason it would be preferable not to use filaments having a generally thin and flat shape because they could become engaged with one another and remain in this position so that the electrolyte does not pass between them.

Throughout the description, the counter electrode and the electrolyte container have been shown as separate elements. It is intended that such an arrangement when described and claimed will include the equivalent structure (where applicable) of a container which either doubles as an electrode or which includes such an electrode in the structure of the container.

For any given volume of working electrode, the surface area available will be a maximum when the surface area of the filaments is a maximum. Consequently, the smallest possible cross-section would give the best results within the limits of practical application of such small cross-sections. For this reason the coated carbon fiber electrode has particular advantages for use with metals which can not be made in very small cross-sections or which are too expensive to use as a pure metal filament.

Reference is now made to FIG. 5 which illustrates a general use of a metallic filament electrode 70 which is of coated carbon fibers. Electrolyte 72 flows into an inclined trough 74 containing the electrode, and after passing over the working electrode 70 passes over a counter electrode 76. The electrodes are coupled to an electrical supply 78.

It is within one of the aspects of the invention to provide coated carbon fiber electrodes generally in any form suitable for use in electrochemical processes.

What we claim is:
1. An electrochemical reactor comprising:
   a container having means defining at least one inlet and at least one outlet and including means defining an electrolyte flow path between the inlet and the outlet;
   a working electrode positioned in the electrolyte flow path, the electrode being of a plurality of metallic filaments arranged in a group with each filament being generally in side-by-side relationship with other filaments so that each filament makes numerous electrical connections by contact with other filaments over the length of the filaments and such that the group of filaments exhibits a significant thickness in all directions measured perpendicularly of each fiber so that in use electrolyte must take a tortuous path through the group of metallic filaments, each of the metallic filaments having a relatively good electrical conductivity and having a very small maximum thickness compared with the length of the filament, the length being such that individually the filaments exhibit no significant resistance to transverse deflection, and means coupled to at least some of the filaments electrically for establishing an electrical potential substantially throughout the electrode; and
   a counter-electrode positioned in the container and spaced from the working electrode.
2. An electrochemical reactor as claimed in claim 1 in which the housing is an electrochemical diaphragm.
3. An electrochemical reactor as claimed in claim 1 and further comprising an electrochemical diaphragm positioned in the container to divide the container into a part containing the working electrode and a second part containing the counter-electrode.

* * * * *

UNITED STATES PATENT OFFICE
CERTIFICATE OF CORRECTION

Patent No. 4,108,755          Dated August 22, 1978

Inventor(s) Bernard Fleet & Sankar Das Gupta

It is certified that error appears in the above-identified patent and that said Letters Patent are hereby corrected as shown below:

Title page, column 1, insert after [22]

[30] Foreign Application Priority Data

August 7, 1974    United Kingdom   34770

November 5, 1974  United Kingdom   49553

Signed and Sealed this

First Day of April 1980

[SEAL]

Attest:

SIDNEY A. DIAMOND

Attesting Officer    Commissioner of Patents and Trademarks